United States Patent Office 3,053,814
Patented Sept. 11, 1962

3,053,814
IMIDES OF ISOBUTYLENE/MALEIC ANHYDRIDE INTERPOLYMERS
Ross M. Hedrick, Dayton, Ohio, assignor to Monsanto Chemical Company, St. Louis, Mo., a corporation of Delaware
No Drawing. Filed Feb. 15, 1960, Ser. No. 8,517
2 Claims. (Cl. 260—78.5)

The invention relates to new and useful compositions which are imides of isobutylene/maleic anhydride interpolymers.

The new compositions are water insoluble and those having the higher percentages of imides form water insensitive films and coatings. These imide compositions are formed by ammoniating isobutylene/maleic anhydride interpolymer at elevated temperatures. The differences in properties of the compositions of the invention as compared, for example, to imides of ammoniated ethylene/maleic anhydride interpolymers is very marked. Even substantially completely imidated ethylene/maleic anhydride interpolymers are water soluble, i.e., these interpolymers wherein all or substantially all of the anhydride groups have been converted to imide. This is contrasted to the compositions of the invention wherein compositions having as low as about 40% imide, i.e., 40% of the anhydride groups converted to imide, are water insoluble and compositions of the invention having then about 55% imide form water insensitive films; however, for water insensitive films compositions having at least about 70% imide, preferably at least about 85% imide are desirable. The compositions of the invention are soluble in water containing ammonium hydroxide, but upon exposure to air and loss of ammonia the solution gels and the gels dry to water insoluble films. The imides are substantially linear polymers containing no appreciable amount of cross-linking.

It is an object of this invention to provide new and useful compositions of matter.

It is another object of this invention to provide new compositions useful as components in waxes, polishes, paints, etc. to form water insensitive films.

It is another object of the invention to provide thickeners for synthetic rubbers especially rubbers containing styrene latices such as styrene/butadiene rubbers.

It is another object of this invention to provide new adhesive compositions which very quickly develop their strength even before all the solvent has evaporated.

It is another object of this invention to provide new compositions with different solution properties, e.g., viscosity, varying with the pH of the solution.

It is another object of the invention to provide a new paper sizing material.

These and other objects of the invention will become apparent as the detailed description of the invention proceeds.

The isobutylene/maleic anhydride interpolymers which are intermediates in the formation of the new composition of the invention are high molecular weight linear polymers preferably having a weight average molecular weight in excess of about 10,000. In making these intermediates the temperature of polymerization is maintained at a sufficiently low value that the desired high molecular weight polymers are obtained.

The following is a description of the making of a typical isobutylene/maleic anhydride interpolymer usable as an intermediate in making the new compositions of the invention: The reaction vessel is a pressure vessel preferably glass lined provided with temperature control, reflux condenser, means for liquid reactant addition, stirrer, etc. To the vessel is added 766 grams of benzene, 60.7 grams of maleic anhydride, 63.9 grams of isobutylene and 0.771 gram of benzoylperoxide. The polymerization is carried out at a temperature of about 54°–56° C. and a pressure of about 5–10 p.s.i.g. for about seven hours, then at a temperature of about 68° C. for about two hours to give substantially 100 percent conversion. The polymer product forms a slurry in the benzene. After separation of most of the benzene, for example, by filtration, the intermediate product is preferably dried under vacuum at a temperature of about 80°–90° C. This intermediate isobutylene/maleic anhydride interpolymer product when made in this manner is in the form of a free-flowing powdery material.

Starting from the intermediate product isobutylene/maleic anhydride interpolymer exemplified in the preceding paragraph, products of the invention can be made in several ways. One of the best methods involves a second intermediate step of making an intermediate product which is the amide/ammonium salt of the interpolymer. This involves ammoniating, i.e., adding anhydrous ammonia to the interpolymer at a temperature of not more than about 140° C. until the anhydride is substantially completely converted to the amide/ammonium salt form. The reaction is exothermic and it is necessary to add the ammonia at a sufficiently slow rate or cool the reactants to keep the temperature within the desired range. An inert gas such as nitrogen can be used to dilute the ammonia and aid in carrying away the exothermic heat of reaction. The amide/ammonium salt like the anhydride is a free-flowing powder easily handled in the subsequent treatment.

An alternate route for making the amide/ammonium salt intermediate product is to slurry the anhydride interpolymer in water and add concentrated ammonium hydroxide thereto with vigorous stirring. The resulting product even when relatively large amounts of water to anhydride interpolymer are used is normally a viscous solution. Drying of this product is difficult and the resulting amide/ammonium salt from the drying step will usually be in the form of non-uniform pieces of material which normally should be ground before use in the final step of the method. Thus it is seen that the dry process of ammoniating the interpolymer is normally the preferred method.

Still another good method of making the amide/ammonium salt of the isobutylene/maleic anhydride interpolymer is to ammoniate the interpolymer in benzene slurry. By this method the interpolymer upon being made in benzene slurry would not be separated from the benzene and dried but rather the ammoniating steps would be carried on suitably at benzene reflux temperature after the completion of the polymerization step. Exothermic heat of reaction from the ammoniating step is then easily removed with a condenser from refluxing benzene. After the completion of the formation of the amide/ammonium salt of the interpolymer, this intermediate product is then treated in a fashion similar to that described for the interpolymer itself to separate the benzene and dry the product.

The following are several typical preparations of the imide compositions of the invention:

*Example 1*

A sample of 82 grams of an amide/ammonium salt of isobutylene/maleic anhydride interpolymer was heated in a stirred 500 ml. flask using an oil bath as a source of heat to 175°–180° C. under a constant slow stream of ammonia. Water evolution began at about 140° C. The maximum rate of ammonia swept through the system was limited to reduce losses of product being swept out of the system as fines. After six and one-quarter hours at reaction temperature the flask and contents were cooled.

The product (50 grams) contained 8.74% nitrogen which is equivalent to approximately 95.5% imide formation.

*Example 2*

An alternative method of making the imide is merely to heat the amide/ammonium salt of the interpolymer at a temperature of about 180° C. for about 24 hours without the addition of ammonia. By this alternative method a product having 9.15% nitrogen, 75.5% imide was made.

*Example 3*

This example describes a pilot plant size imidation run wherein samples were taken during the course of the reaction, analyzed and tested. To the reactor was charged 30 pounds of amide/ammonium salt of isobutylene/maleic anhydride interpolymer. The reactor was a steel vessel which was steam-jacketed for heating. Agitation of the polymer was begun and 135 p.s.i.g. steam was used to heat the amide/ammonium salt. Ammonia was added at the rate of 0.5 lb./hr. during the heat up and the reaction period. When the temperature of the reactor charge reached 130° C., sampling of the reaction product began. The time of heating above 130° C. was deliberately extended to beyond 23 hours so a time-temperature imidation curve could be established. The maximum temperature reached of the reaction mixture was 158° C. A rough test for percent imidation which will indicate the percent imidation in excess of about 70% is when a 5% solution of polymer in aqueous ammonia (2 ml. of concentrated ammonium hydroxide per gram of polymer) forms a non-tacky and readily strippable film 30–60 seconds after being cast (in air) on a flat surface or one's finger. The results of the sampling experiments are as follows, zero time beginning at reaction product temperature of 130° C.:

| Sample No. | Hours | Percent Nitrogen | Percent Imide | Remarks |
|---|---|---|---|---|
| 1 | 0 | 1.15 | 12.64 | soluble and clear. |
| 2 | 1 | 2.09 | 22.56 | Cloudy dispersion. |
| 3 | 1.5 | 2.51 | 27.65 | Do. |
| 4 | 2 | 3.01 | 33.04 | Do. |
| 5 | 3 | 3.63 | 39.83 | continuous film—cloudy. |
| 6 | 4 | 4.20 | 46.06 | slightly attacked, hazy, tough film. |
| 7 | 6 | 5.24 | 57.43 | |
| 8 | 8 | 5.87 | 64.30 | |
| 9 | 10 | 5.90 | 64.63 | |
| 10 | 12 | 6.07 | 66.48 | not appreciably attacked, films highly cracked on initial drying, flakes washed loose when wet but did not appear to swell. |
| 11 | 14 | 6.18 | 67.68 | |
| 12[1] | 16 | 6.25 | 68.44 | |
| 13 | 18 | 6.25 | 68.44 | |
| 14 | 20 | 6.22 | 68.34 | |
| 15 | 22 | 6.37 | 69.75 | |
| 16 | 23.8 | 6.31 | 69.64 | |
| 17 | End of Run | 6.41 | 70.19 | |
| 18[2] | | 7.93 | 86.74 | |
| 19[2] | | 9.10 | 99.45 | |

[1] For the samples from No. 12 on, an additional 3 ml. of concentrated ammonium hydroxide was added to give clear solutions for the casting of films.
[2] Samples 18 and 19 were products of other imidation runs. They required a total of 15 ml. of concentrated ammonium hydroxide to put them in solution and they behaved similarly in the water treatment film test to the other high percent imide samples.

The remarks in the table above are directed to the effect of water on films cast from the samples. Solutions of the samples were made by suspending 5 grams of a sample in 90 ml. of water and adding 10 ml. of concentrated (28% NH$_3$) to dissolve the sample. Films were cast from the solutions on glass plates using a doctor blade that gave a film 0.008" thick. The cast films were allowed to air dry at room temperature (about 23° C.) for 5 days before testing. The films were tested by adding water over a portion of the film and observing behavior of the film.

In an alternative process isobutylene/maleic anhydride interpolymer rather than the amide/ammonium salt is ammoniated in a single treating step to the imide. This process is carried out in a similar manner to the imidation process of Example 1, however, advantage is taken of the exothermic heat of reaction of the ammonia with the anhydride to heat up the polymer to reaction temperature. Substantial reaction begins with the evolution of water at a temperature of about 140° C. Final reaction temperature is of the order of about 180° C. Imidation occurs at temperatures above about 150° C. but goes quite slowly at such temperatures. Therefore, final reaction of temperatures should be of the order of about 180° C. to reduce the time of reaction. During the early stages of the reaction it is desirable to reduce the rate of addition of ammonia to avoid substantial loss of product in the form of fines. After the reaction slows down appreciably, the ammonia rate is increased.

As has been indicated previously the imides of the invention depending upon the degree of imidation have a variety of uses. Compositions having at least about 70%, preferably in excess of about 85% imide are particularly useful as components in waxes, polishes, paints, etc., the films therefrom being particularly water-insensitive. Also, these high percent imide compositions are excellent latex thickeners especially for synthetic rubbers having styrene latices, such as, for example, butadiene/styrene rubbers. Also, aqueous ammonium solutions of these imides are very good adhesives, substantial strength developing in the adhesives on the evaporation of the ammonia even before the water evaporates. A further use particularly for the substantial 100% imides is as a high softening point plastic material. Yet a further use for the compositions having high percentages of imides is as a paper sizing material. Yet another use for these imides is as soil stabilizers. A particular use for the insoluble imides having lower percentages of imide of the order of about 40% to about 70% is to make a wide variety of solutions differing in viscosity as a function of pH. This property is indicative of uses of the materials as thickeners for paint, cosmetics applications, toothpaste, polymer emulsions, and the like. Plasticizers such as polyethylene glycol can be used to increase the flexibility of the films of the imide. Additional uses of the imide are in oil drilling muds as water loss inhibitors. It will be obvious from the properties of the material and suggested uses that the material is also useful in a number of other applications.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. An imide composition comprising substantially a 1:1 molar interpolymer of isobutylene and maleic anhydride having a molecular weight in excess of about 10,000, said interpolymer having at least sufficient of the anhydride groups converted to imide groups to make the composition water-insoluble and substantially all the balance of the anhydride groups converted to amide and ammonium salt groups.

2. The composition of claim 1 wherein at least about 85% of the anhydride groups have been converted to imide.

References Cited in the file of this patent

UNITED STATES PATENTS 2,921,928    Fields et al. _____ Jan. 19, 1960